(12) United States Patent
Lin

(10) Patent No.: US 11,189,019 B2
(45) Date of Patent: Nov. 30, 2021

(54) METHOD FOR DETECTING DEFECTS, ELECTRONIC DEVICE, AND COMPUTER READABLE MEDIUM

(71) Applicant: HON HAI PRECISION INDUSTRY CO., LTD., New Taipei (TW)

(72) Inventor: Jung-Yi Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 129 days.

(21) Appl. No.: 16/539,031

(22) Filed: Aug. 13, 2019

(65) Prior Publication Data

US 2020/0357106 A1 Nov. 12, 2020

(30) Foreign Application Priority Data

May 9, 2019 (CN) .......................... 201910385705.2

(51) Int. Cl.
*G06T 7/00* (2017.01)
*G06K 9/62* (2006.01)

(52) U.S. Cl.
CPC .......... *G06T 7/0002* (2013.01); *G06K 9/6202* (2013.01); *G06K 9/6215* (2013.01); *G06T 2207/20021* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

| 2007/0053580 | A1* | 3/2007 | Ishikawa | G06T 7/001 |
| | | | | 382/149 |
| 2019/0096057 | A1* | 3/2019 | Allen | G06T 7/0008 |
| 2020/0175324 | A1* | 6/2020 | Takahashi | G06T 7/11 |

FOREIGN PATENT DOCUMENTS

| CN | 109829914 A | * | 5/2019 |
| CN | 109949305 A | * | 6/2019 |
| TW | 201504829 A | | 2/2015 |
| TW | 201814244 A | | 4/2018 |

* cited by examiner

*Primary Examiner* — Delomia L Gilliard
(74) *Attorney, Agent, or Firm* — ScienBiziP, P.C.

(57) ABSTRACT

A method for detecting defects in manufactured objects includes acquiring a high-resolution image of an object for test, dividing the image into a plurality of smaller sub-images and determining, by a first model, whether each of the small sub-images is similar to a preset template image. The test object is determined to be flawless, when each of the sub-images is found to be similar to a template image. When sub-images are not found sufficiently similar to template images, determining, by a second model, whether a defect is shown to exist within each sub-image, and if so the test object is declared defective. The longer application of the second model is only applied if testing for defects is not resolved by the application of the first model. An electronic device and a computer readable storage medium are also provided.

16 Claims, 3 Drawing Sheets

METHOD FOR DETECTING DEFECTS, ELECTRONIC DEVICE, AND COMPUTER READABLE MEDIUM

FIELD

The disclosure generally relates to quality control.

BACKGROUND

At present, defects can be detected by analyzing an image of an object. A size of the defect may be far less than a size of the object, and if the image of the object is obtained by a camera with low resolution, the defect may be not rendered in clarity due to insufficient resolution. If the image of the object is obtained by a camera with high resolution, the amount of computation of the convolutional neural network (CNN) model is large, and completing image processing is very difficult due to hardware conditions. For example, when an image is resolved using the CNN model, the image is compressed to a smaller resolution, such as 224*224, at which point the defect may become unreadable on the image, making distinguishing and analyzing the defect in the image difficult.

BRIEF DESCRIPTION OF THE DRAWINGS

Implementations of the present technology will now be described, by way of embodiments, with reference to the attached figures.

DETAILED DESCRIPTION

Figure 1:
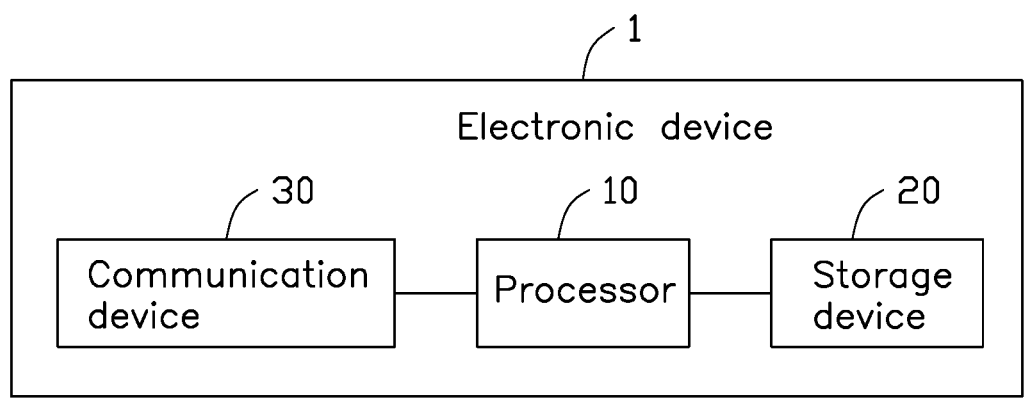
FIG. 1 is a block diagram illustrating an embodiment of an electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The term "comprising" means "including, but not necessarily limited to", it specifically indicates open-ended inclusion or membership in a so-described combination, group, series, and the like.

FIG. 1 illustrates an embodiment of an electronic device 1. The electronic device 1 can include a processor 10, a storage device 20, and a communication device 30. The storage device 20 and the communication device 30 are connected to the processor 11. The electronic device 1 can be a computer, a server, or a controller. The processor 10 can be more than one.

The processor 10 may include one or more central processors (CPU), a microprocessor, a digital processing chip, a graphics processor, or a combination of various control chips.

The processor 10 is a control unit of the electronic device 1. The processor 10 can be configured to run or execute programs or modules stored in the storage device 20, as well as the data stored in the storage device 20, to execute the defect detection system 100 (see FIG. 2).

The storage device 20 stores various types of data in the electronic device 10, such as program codes and the like. The storage device 20 can be, but is not limited to, read-only memory (ROM), random-access memory (RAM), programmable read-only memory (PROM), erasable programmable ROM (EPROM), one-time programmable read-only memory (OTPROM), electrically EPROM (EEPROM), compact disc read-only memory (CD-ROM), hard disk, solid state drive, or other forms of electronic, electromagnetic, or optical recording medium.

The communicating device 30 can communicate with an image obtaining device, or other electronic devices, wirelessly or by wires.

The electronic device 1 may include more or less components than those illustrated, or combine some components, or be otherwise different. For example, the electronic device 1 may also include input and output devices, network access devices, buses, and the like.

Figure 2:
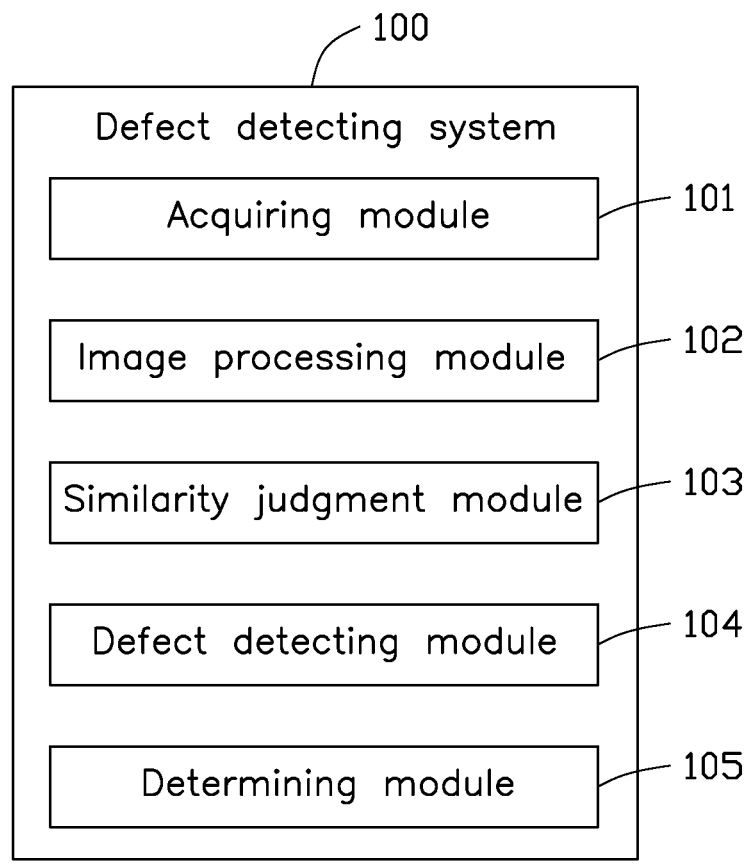
FIG. 2 is a block diagram illustrating an embodiment of a defect detecting system in the device of FIG. 1.

FIG. 2 shows the defect detecting system 100 running in the electronic device 1. The defect detecting system 1 may include a plurality of modules, which are a collection of software instructions stored in the storage device 20 and executable by the processor 10. In the embodiment as disclosed, the defect detecting system 100 can include an acquiring module 101, an image processing module 102, a similarity judgment module 103, a defect detecting module 104, and a determining module 105.

The acquiring module 101 acquires an image of an object under test.

The image processing module 102 divides the image of the object into a plurality of sub-images. Each sub-image is a small-sized image that can be used for machine learning.

The similarity judgment module 103 determines whether and how much each of the sub-images is similar to a preset template image, by using a first model. The template image is an image of an object without defects. For example, the template image can be a normal image determined to be showing a flawless object after detecting for test the same or identical object. The template image can be one or more. When the number of the template images is multiple, the similarity judgment module 103 matches the sub-image with a template image, and then determines whether the sub-image is similar to the matched template image.

In at least one embodiment, the first model is a similarity judgment model. The similarity judgment model includes a formula for calculating similarities between two images. For example, the formula calculates the number of pixels which are same in the two images, and then calculates the similarity between the two images.

In an other embodiment, the first model is a Convolutional Neural Network (CNN) model or other neural network model, such as a VGG model, a ResNet model, and the like.

The similarity judgment module 103 matches the sub-image with a template image, obtains a similarity value of the sub-image by using the first model, and then determines whether the similarity value is greater than a preset value. If the similarity value is greater, the similarity judgment module 103 determines that the sub-image is sufficiently similar to the template image. If not, the similarity judgment module 103 determines that the sub-image is not similar.

The defect detecting module 104 detects whether one or more defects appear within the sub-image by using a second model. The second model can be a CNN model. In at least one embodiment, the defect detecting module 104 is configured to detect the sub-image which shows an object not similar to that of the template image.

The determining module 105 determines whether the test object has a defect according to the determination by the similarity judgment module 103 or by the defect detecting module 104. When the similarity judgment module 103 determines that a sub-image shows sufficient similarity to the template image, the determining module 105 determines that the object being tested is flawless. When the defect detecting module 104 determines that no defect exists in the sub-image, the determining module 105 determines that the test object is flawless.

Figure 3:
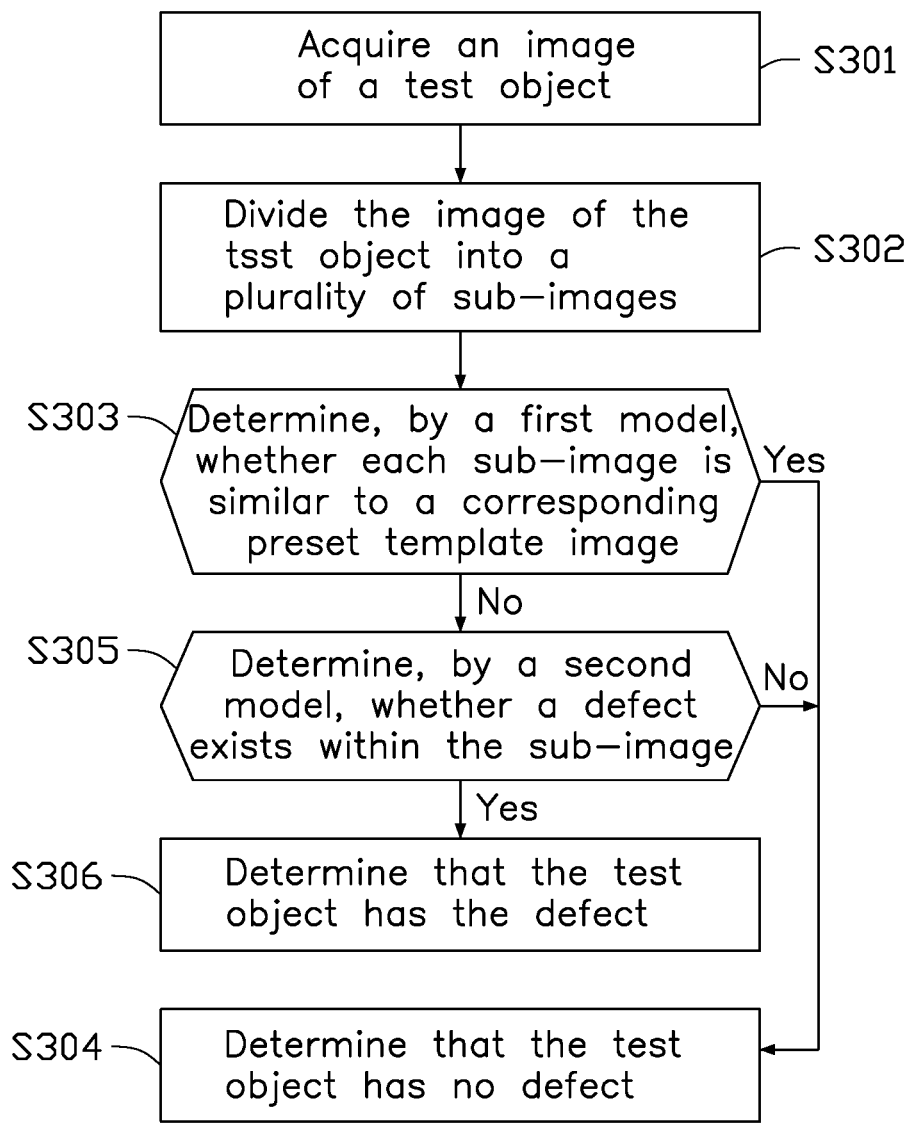
FIG. 3 is a flowchart illustrating an embodiment of a method for detecting defects.

A defect detecting method is illustrated in FIG. 3. The method is provided by way of embodiments, as there are a variety of ways to carry out the method. Each block shown in FIG. 3 represents one or more processes, methods, or subroutines carried out in the example method. Additionally, the illustrated order of blocks is by example only and the order of the blocks can be changed. The method can begin at block S301.

At block S301, an image of the test object is acquired.

The acquiring module 101 acquires the image of the test object. The image of the test object can be a large size image file with high resolution.

At block S302, the image of the test object is divided into a plurality of sub-images.

The image processing module 102 divides the large image of the test object into a plurality of sub-images, thereby the sub-images can be tested separately. The sub-image can be a small sized image file that can be used for machine learning.

In at least one embodiment, the process at block S302 includes searching for an effective edge or boundary of the image of the test object, distinguishing a detection area and a non-detection area of the image according to the effective edge, and then dividing the detection area into the plurality of sub-images. When the size of the object to be tested is large and relatively uniform, at least some of sub-images will be extremely similar.

In at least one embodiment, the image of the object may be evenly divided into a plurality of images to be tested according to a size of a preset template image.

At block S303, a determination is made as to whether each of the plurality of sub-images is similar to a preset template image by using a first model.

The similarity judgment module 103 determines, by using the first model, whether a sub-image matches or is similar to a template image. The template image is an image of the object without defects.

In at least one embodiment, the first model is a similarity judgment model. The similarity judgment model includes a formula for calculating similarities between images. For example, the formula is used to calculate the number of pixels which are same in two images, and then calculate the similarity between the two images.

In another embodiment, the first model is a CNN model or other neural network models, such as a VGG model, a ResNet model, or the like.

In at least one embodiment, the process at block S303 includes matching the sub-image against the template image; acquiring a similarity value between the sub-image and the template image by using the first model; and determining whether the similarity value is greater than a preset threshold. If the similarity value is greater than or equal to the preset value, it is determined that the sub-image is similar to the preset template image. If the similarity value is not greater than the preset value, it is determined that the sub-image is not similar to the preset template image.

If each sub-image is similar to a template image, the process proceeds to block S304. If any of the sub-images is not similar to a template image, the process proceeds to block S305.

At block S304, it is determined that the test object has no defect.

When each image to be tested is similar to a template image, the determining module 105 determines that the test object has no defect.

At block S305, a determination is made as to whether a defect exists within the sub-image by using a second model.

The defect detecting module 104 determine whether at least one defect is shown to exist within a sub-image which is not similar to a template image.

The second model can be a neural network model. In this embodiment, the second model may be a CNN model. It can be understood that the second model can also be other neural network models, such as a VGG model, a ResNet model, or the like.

If the defect detection module 104 determines that at least one defect exists within the sub-image, then the process proceeds to block S306, where it is determined that the test object has at least one defect. If not, it is determined that the test object has no defect.

The above defect detecting method can detect flaws in the object by analyzing the image of the object. The method firstly determines whether the sub-image is similar to a template image. If each sub-image is similar to a template image, the image is directly determined to be an image of a flawless object and there is no need to use the second model. Since the amount of calculation of the first model is smaller than the amount of the second model, the method improves the efficiency of defect detection. Moreover, for a large-sized object to be tested, at least some of the sub-images are very similar, and the similarity judgment is performed by the first model, which saves detection time and further improves efficiency of the defect detection.

The above disclosure is suitable for a large-sized object to be tested at a high resolution, and does not need to reduce the resolution of the image of the object to be tested. Therefore, the above method has a wider application range.

A person skilled in the art can understand that all or part of the processes in the above embodiments can be implemented by a computer program to instruct related hardware, and that the program can be stored in a computer readable storage medium. When the program is executed, a flow of steps of the methods as described above may be included.

In addition, each functional device in each embodiment may be integrated in one processor, or each device may exist physically separately, or two or more devices may be integrated in one device. The above integrated device can be implemented in the form of hardware or in the form of hardware plus software function modules.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being embodiments of the present disclosure.

What is claimed is:

1. A defect detecting method comprising:
acquiring an image of a test object;
dividing the image of the test object evenly into a plurality of sub-images according to a size of a preset template image;
determining, by a first model, whether each of the plurality of sub-images is similar to the template image, wherein
if each of the plurality of sub-images is similar to the template image, determining that the test object has no defect, and
if any of the plurality of the sub-images is not similar to the template image, determining, by a second model, whether at least one defect exists within the sub-image; and determining that the test object comprise at least one defect if at least one defect exists within the sub-image, wherein the second model is different from the first model.

2. The defect detecting method of claim 1, wherein a process of determining whether each of the plurality of sub-images is similar the template image, comprises:
matching each of the plurality of sub-images against the template image;
obtaining a similarity value of each of the plurality of sub-images according to the first model;
determining whether the similarity value is greater than a preset value, wherein
determining that the sub-image is similar to the template image, if the similarity value is greater than or equal to the preset value, and
determining that the sub-image is not similar to the template image, if the similarity value is not greater than the preset value.

3. The defect detecting method of claim 1, wherein the first model is a similarity judgment model comprising a formula for calculating similarities between images, wherein the formula calculates a number of pixels which are same in two images, and then calculates the similarity value between the two images.

4. The defect detecting method of claim 1, wherein the first model is a convolutional neural network model.

5. The defect detecting method of claim 1, wherein the second model is a VGG model, or a ResNet model.

6. The defect detecting method of claim 1, wherein a process of dividing the image of the test object into a plurality of sub-images comprises:
searching for a boundary of the image of the test object;
distinguishing a detection area and a non-detection area of the image; and
dividing the detection area into the plurality of sub-images.

7. An electronic device, configured for detecting a defect on a surface of a detect object, comprising:
at least one processor;
at least one storage device storing one or more programs, when executed by the processor, the one or more programs cause the processor to:
acquire an image of a test object;
divide the image of the test object evenly into a plurality of sub-images according to a size of a preset template image;
determine, by a first model, whether each of the plurality of sub-images is similar to the template image, wherein
if each of the plurality of sub-images is similar to the template image, determine that the test object has no defect, and
if any of the plurality of the sub-images is not similar to the template image, determine, by a second model, whether at least one defect exists within the sub-image; and determine that the test object comprise at least one defect if at least one defect exists within the sub-image, wherein the second model is different from the first model.

8. The electronic device of claim 7, wherein a process of determining whether each of the sub-images is similar the template image, comprises:
matching each of the plurality of sub-images against the template image;
obtaining a similarity value of each of the plurality of sub-images according to the first model;
determining whether the similarity value is greater than a preset value, wherein
determining that the sub-image is similar to the template image, if the similarity value is greater than or equal to the preset value, and
determining that the sub-image is not similar to the template image, if the similarity value is not greater than the preset value.

9. The electronic device of claim 7, wherein the first model is a similarity judgment model comprising a formula for calculating image similarity, wherein the formula calculates a number of pixels which are same in two images, and then calculates the similarity value between the two images.

10. The electronic device of claim 7, wherein the first model is a convolutional neural network model.

11. The electronic device of claim 7, wherein the second model is a VGG model, or a ResNet model.

12. The electronic device of claim 7, wherein a process of dividing the image of the test object into a plurality of sub-images comprises:
searching for a boundary of the image of the test object;
distinguishing a detection area and a non-detection area of the image; and
dividing the detection area into the plurality of sub-images.

13. A non-transitory computer readable storage medium having stored thereon instructions that, when executed by at least one processor of a computing device, causes the processor to perform a defect detecting method, wherein the method comprises:
acquiring an image of a test object;
dividing the image of the test object evenly into a plurality of sub-images according to a size of a preset template image;
determining, by a first model, whether each of the plurality of sub-images is similar to the template image, wherein
if each of the plurality of sub-images is similar to the template image, determining that the test object has no defect, and
if any of the plurality of the sub-images is not similar to the template image, determining, by a second model, whether at least one defect exists within the sub-image; and
determining that the test object comprise at least one defect if at least one defect exists within the sub-image, wherein the second model is different from the first model.

14. The non-transitory computer readable storage medium of claim 13, wherein a process of determining whether each of the sub-images is similar the corresponding template image, comprises:

matching each of the plurality of sub-images against the template image;
obtaining a similarity value of each of the plurality of sub-images according to the first model;
determining whether the similarity value is greater than a preset value, wherein
determining that the sub-image is similar to the template image, if the similarity value is greater than or equal to the preset value, and
determining that the sub-image is not similar to the template image, if the similarity value is not greater than the preset value.

15. The non-transitory computer readable storage medium of claim 13, wherein the first model is a similarity judgment model, the second model is a convolutional neural network model.

16. The non-transitory computer readable storage medium of claim 13, wherein a process of dividing the image of the test object into a plurality of sub-images comprises:
searching for a boundary of the image of the test object;
distinguishing a detection area and a non-detection area of the image; and
dividing the detection area into the plurality of sub-images.

* * * * *